(12) United States Patent
Soubjaki

(10) Patent No.: US 7,955,542 B2
(45) Date of Patent: Jun. 7, 2011

(54) METHOD OF PRODUCING A THROTTLE ASSEMBLY

(75) Inventor: Houssam Soubjaki, Huntington Woods, MI (US)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 12/467,854

(22) Filed: May 18, 2009

(65) Prior Publication Data

US 2010/0289180 A1   Nov. 18, 2010

(51) Int. Cl.
   B29C 45/14 (2006.01)
(52) U.S. Cl. ............ 264/242; 264/255; 264/328.7; 264/328.8
(58) Field of Classification Search ............ None
   See application file for complete search history.

(56) References Cited

U.S. PATENT DOCUMENTS

| | | |
|---|---|---|
| 3,930,477 A | 1/1976 | Jordan |
| 3,985,112 A | 10/1976 | Jordan |
| 4,007,720 A | 2/1977 | Brettschneider et al. |
| 4,212,273 A | 7/1980 | Maruoka |
| 4,345,569 A | 8/1982 | Hattori et al. |
| 4,485,065 A | 11/1984 | Hatakeyama et al. |
| 4,491,106 A | 1/1985 | Morris |
| 4,633,833 A | 1/1987 | Morris |
| 4,651,702 A | 3/1987 | Nara et al. |
| 4,671,245 A | 6/1987 | Knapp |
| 4,717,808 A | 1/1988 | Cyll et al. |
| 4,718,383 A | 1/1988 | Fujisawa |
| 4,814,586 A | 3/1989 | Grise |
| 4,861,966 A | 8/1989 | Matthiesen et al. |
| 4,912,306 A | 3/1990 | Grise et al. |
| 4,935,184 A | 6/1990 | Sorensen |
| 5,025,131 A | 6/1991 | van Konyenburg et al. |
| 5,078,115 A | 1/1992 | Yamashita et al. |
| 5,093,898 A | 3/1992 | van Konynenburg et al. |
| 5,209,211 A | 5/1993 | Kopp et al. |
| 5,304,336 A * | 4/1994 | Karlsson et al. .......... 264/242 |

(Continued)

FOREIGN PATENT DOCUMENTS

EP   0409393   1/1991

(Continued)

OTHER PUBLICATIONS

Office Action for United States Patent Application, U.S. Appl. No. 12/467,868, dated Sep. 30, 2009.

*Primary Examiner* — Edmund H. Lee
(74) *Attorney, Agent, or Firm* — Michael Best & Friedrich LLP

(57) ABSTRACT

A method of producing a throttle assembly. The method including inserting a first core into a mold portion to form a first throttle component cavity between the first core and the mold portion, providing a first thermoset plastic material into the first throttle component cavity to form a first throttle component, removing the first core from the mold portion while maintaining the first throttle component positioned within the mold portion, inserting a second core into the mold portion to form a second throttle component cavity between the mold portion, the first throttle component, and the second core, providing a second thermoset plastic material into the second throttle component cavity to form a second throttle component, removing the second core from the mold portion, removing the first throttle component and the second throttle component from the mold portion, and separating the first throttle component from the second throttle component.

21 Claims, 4 Drawing Sheets

U.S. PATENT DOCUMENTS

| | | |
|---|---|---|
| 5,590,681 A | 1/1997 | Schaefer et al. |
| 5,705,112 A | 1/1998 | Gram |
| 5,735,985 A | 4/1998 | Ghosh et al. |
| 6,106,263 A | 8/2000 | Schmid et al. |
| 6,176,265 B1 | 1/2001 | Takahashi et al. |
| 6,296,007 B1 | 10/2001 | Cifune |
| 6,357,414 B1 | 3/2002 | Kalinowski et al. |
| 6,412,479 B1 | 7/2002 | Canfield et al. |
| 6,451,238 B1 * | 9/2002 | Suzuki et al. ............ 264/250 |
| 6,543,412 B2 | 4/2003 | Amou et al. |
| 6,595,185 B2 | 7/2003 | Michels |
| 6,685,634 B1 | 2/2004 | Fry |
| 6,782,912 B2 | 8/2004 | Soubjaki |
| 7,022,277 B2 | 4/2006 | Bosshardt et al. |
| 7,089,918 B2 | 8/2006 | Gilmour et al. |
| 7,237,529 B2 | 7/2007 | Hannewald et al. |
| 7,610,677 B2 * | 11/2009 | Lorenz et al. ............ 29/888.4 |
| 2001/0030518 A1 | 10/2001 | Reimann |
| 2002/0152988 A1 | 10/2002 | Michels |
| 2004/0182370 A1 | 9/2004 | Parkinson et al. |
| 2007/0084437 A1 | 4/2007 | Winkelmuller et al. |

FOREIGN PATENT DOCUMENTS

| | | |
|---|---|---|
| GB | 2319561 | 5/1998 |
| JP | 6096843 | 4/1994 |

\* cited by examiner

METHOD OF PRODUCING A THROTTLE ASSEMBLY

BACKGROUND

The invention relates to throttle valves and a method of producing throttle valves. Particularly, the invention relates to throttle bodies for automotive applications, and a method of manufacturing a set of mating cones for a conical throttle assembly or other throttling devices. U.S. Pat. No. 6,782,912 discloses a generally conically shaped throttle valve and is incorporated by reference in its entirety herein.

Typically, throttle valves (i.e., throttle bodies, throttle assemblies) include multiple machined components that are assembled using fasteners. The tolerancing of machined parts often leads to slight variation in parts. Machining mating parts with very small or tight tolerances is expensive and time-consuming. In addition to manufacturing limitations, close fitting parts must include additional tolerance due to climatic and environmental condition changes such as humidity and thermal expansion. These additional tolerance requirements may compromise the function of the part over a wide operating range.

SUMMARY

The current machining technology makes the repeatable production of parts with tight tolerances expensive and unrealistic. The invention provides an improved throttle valve formed with precise mating surfaces, repeatably, and at an acceptable cost. In one embodiment, a two shot injection or compression molding technique is utilized (e.g., over-molding or transfer molding).

The material used is a composite thermoset plastic that can include release agents, shrink modifiers, and other additives, as desired. Due to the inherent nature of the materials selected and the tool design, any deviation in one mating part will be reflected in the other mating part. So long as the parts remain as a mating set, there will be no issue with tolerance shift. This process may be used to produce various parts of the throttle valve including matching cone sets, cams, gears, shafts, and/or other parts, thereby reducing the number of parts, the machining required, and assembly processes.

In one embodiment, the invention provides a throttle assembly including a first throttle component that is formed of a plastic material including a conductive additive substantially homogeneously dispersed within the plastic material, and a second throttle component axially aligned with the first throttle component and movable relative to the first throttle component between a first position and a second position to selectively vary a flow through the throttle assembly. A terminal is coupled to the first throttle component such that electricity may be provided to the first throttle component, thereby resistively heating the first throttle component via the conductive additive. A flow window is defined in one of the first throttle component and the second throttle component.

In another embodiment the invention provides a method of producing a throttle assembly. The method includes inserting a first core into a mold portion to form a first throttle component cavity between the first core and the mold portion, providing a first thermoset plastic material into the first throttle component cavity to form a first throttle component, removing the first core from the mold portion while maintaining the first throttle component positioned within the mold portion, inserting a second core into the mold portion to form a second throttle component cavity between the mold portion, the first throttle component, and the second core, providing a second thermoset plastic material into the second throttle component cavity to form a second throttle component, removing the second core from the mold portion, removing the first throttle component and the second throttle component from the mold portion, and at least partially separating the first throttle component from the second throttle component.

Other aspects of the invention will become apparent by consideration of the detailed description and accompanying drawings.

BRIEF DESCRIPTION OF THE DRAWINGS

FIG. 2a is a perspective view of a throttle component of the throttle assembly of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The below detailed description uses several terms known in the art. For example, components of a throttle body or throttle valve are often referred to as cones (e.g., a first throttle cone and a second throttle cone). While the illustrated cones or throttle components may be generally cone shaped, they are not strictly geometrically cone shaped and include features that vary from a geometric cone. Furthermore, the cones may be non-conical in nature, as desired. The throttle components could be any suitable shape for a throttle body or throttle valve, as desired.

Figure 1:
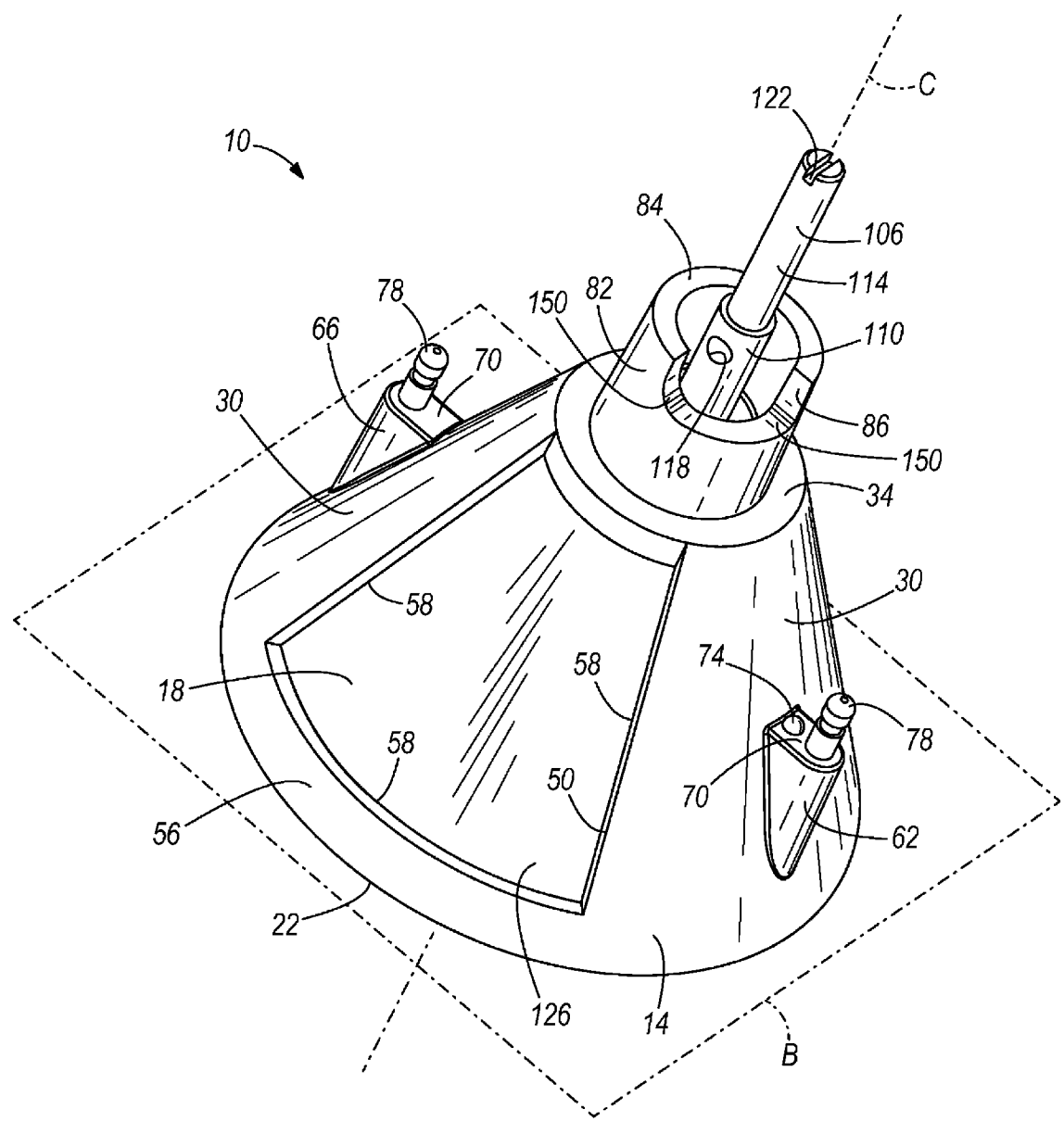
FIG. 1 is a perspective view of a throttle assembly according to one embodiment of the invention.
Figure 2:
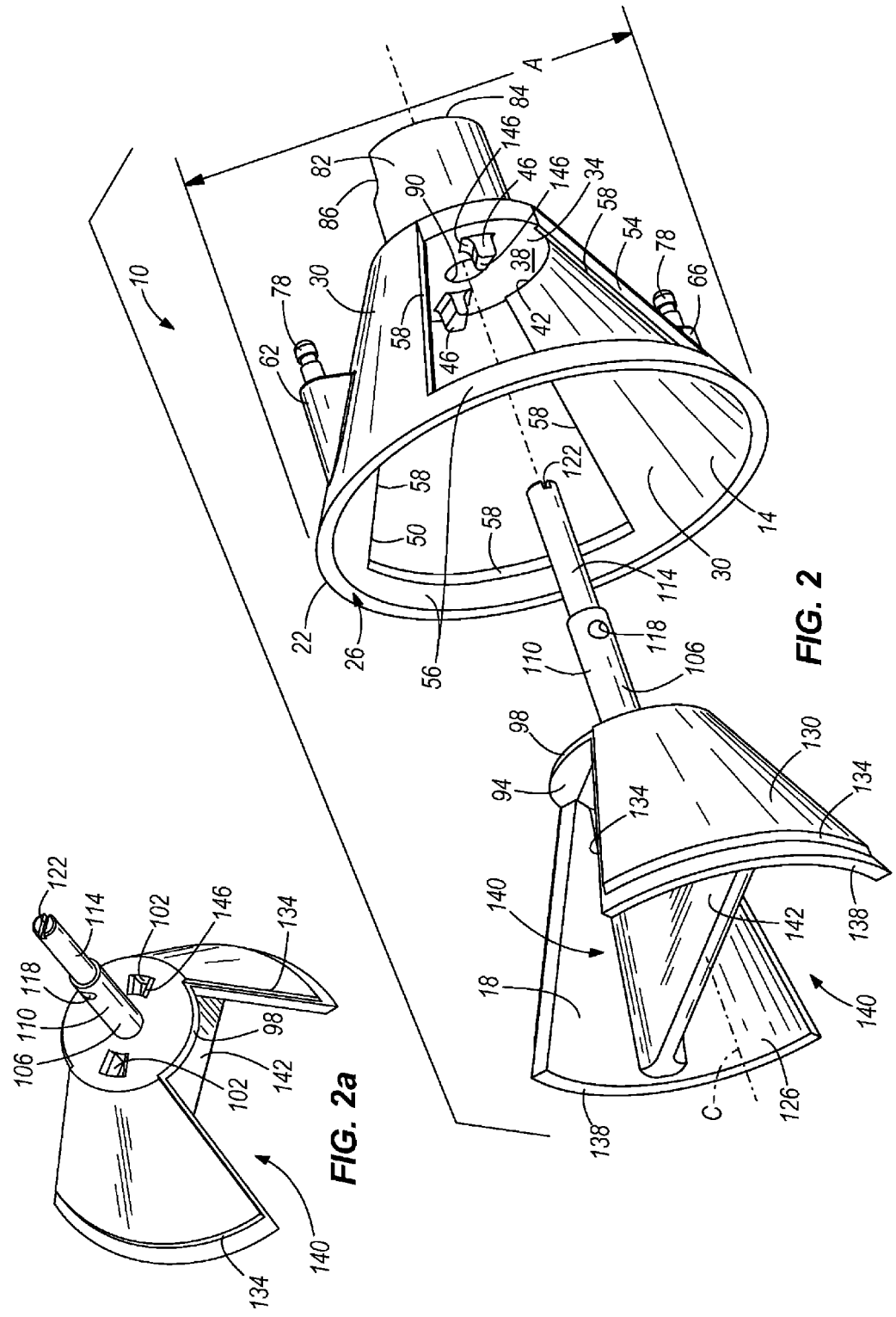
FIG. 2 is an exploded view of the throttle assembly of FIG. 1.

FIGS. 1 and 2 show an air intake throttle assembly or throttle valve 10 for a vehicle. In other embodiments, the throttle valve 10 could be used for beverage dispensing, air conditioning systems, high volume fluid flow throttling, other fluid throttling/valving applications. The illustrated throttle valve 10 is generally conical and includes a first throttle component in the form of a first throttle cone 14 and a second throttle component in the form of a second throttle cone 18. Throttle assemblies or throttle valves are commonly referred to in the art as throttle bodies. In the illustrated embodiment, the first cone 14 is an outer cone and the second cone 18 is an inner cone. In other embodiments, the cones 14, 18 may be arranged differently or may have a different shape or geometry, as desired.

The first throttle cone 14 is generally hollow, frustoconically shaped, and defines a first distal end 22 of the first throttle cone 14. The first distal end 22 has an outer diameter A and a face 26 (FIG. 2) that defines a plane B (FIG. 1).

A wall portion 30 extends from the first distal end 22 in the direction of an axis C and reduces in diameter as it moves away from the first distal end 22 to define a generally frustoconical shape. The wall portion 30 has a generally consistent cross sectional thickness as it extends along the axis C.

An end wall or rim 34 is defined at the end of the frustoconically shaped wall portion 30 opposite the first distal end 22, and defines a flat surface 38 (FIG. 2). The interior of the rim 34 defines a rim sealing surface 42 between the flat surface 38 and the wall portion 30. Two guide cams or tabs 46 are formed on the flat surface 38 and project in the direction of the axis C toward the first distal end 22. The two tabs 46 are positioned on the rim 34 one-hundred-eighty degrees from one another with respect to the axis C. In other embodiments, the two tabs 46 are positioned at a different angle relative to one another and the axis C. Additionally, more or less tabs 46 may be utilized, as desired.

A first window 50 and a second window 54 are formed in the wall portion 30 one-hundred-eighty degrees apart with respect to the axis C. The first and second windows 50, 54 are spaced axially an equal distance from the first distal end 22 such that a support portion 56 exists between the first and second windows 50, 54 and the first distal end 22. The first and second windows 50, 54 are generally wedge-shaped to follow the wall portion 30 and to increase flow area, and define a sealing seat 58 along three edges of the first and second windows 50, 54. Each illustrated sealing seat 58 is a beveled surface. A fourth edge of the first and second windows 50, 54 is defined by the flat surface 38 of the rim 34.

In the illustrated embodiment, the throttle valve 10 is a heated throttle valve. Details of the heating features will be discussed below. The heating feature is optional and can be eliminated such that the throttle valve 10 is not heated. The illustrated first throttle cone 14 (with heating features) includes first and second protrusions 62, 66 that extend from the wall portion 30. The first protrusion 62 includes a flat surface 70 that is substantially parallel to the face 26 of the first distal end 22. A locating bump 74 protrudes from the flat surface 70 of the first protrusion 62 and provides a locating feature to aid in the proper orientation of the throttle valve 10 when installed in the vehicle. Alternatively, the locating bump may be used for orienting an electrical connector (not shown).

The second protrusion 66 is the same as the first protrusion 62 but does not include a locating bump 74. The first and second protrusions 62, 66 are approximately one-hundred-eighty degrees from each other relative to the axis C and are positioned between the windows 50, 54. In the illustrated embodiment, the protrusions 62, 66 are integrally formed with the wall portion 30.

In the illustrated embodiment, a terminal in the form of two electrodes 78 is molded into the first and second protrusions 62, 66 (i.e., one electrode 78 in each protrusion 62, 66). The electrodes 78 are a conductive material (e.g., a ferrous metal, copper, etc.), and are directly connected to the throttle valve 10 via the first and second protrusions 62, 66. Again, the protrusions 62, 66 and the terminal are optional and may be eliminated from the throttle valve 10, as desired. For example, in a temperate or tropical location where freezing temperatures are not expected, a heating throttle valve 10 is not necessary and the heated features may be eliminated. Alternatively, the insert molded electrodes 78 may be replaced with cavities to accept a separately-attached, external terminal. In another embodiment, the electrodes 78 may be replaced by molding out protrusions as part of the first throttle cone 14 to accept a separate mating clip or connector of comparative geometry.

The first throttle cone 14 also includes a generally cylindrical portion 82 that extends along the axis C from the rim 34, away from the first distal end 22, and to a second distal end 84. The cylindrical portion 82 is substantially hollow and defines a cutout area 86 that extends over approximately ninety degrees of the cylindrical portion 82. An aperture 90 extends concentric with the axis C through the rim 34 and into communication with the interior of the cylindrical portion 82 and defines a bearing surface. In the illustrated embodiment, the cutout area 86 is at the second distal end 84. In other embodiments, the cutout area 86 could be an enclosed aperture 90 formed in the cylindrical portion 82. The function and purpose of the cutout area 86 will be discussed further below.

In the illustrated embodiment, the first throttle cone 14 may be molded from a thermoset plastic such as a bulk molding compound (BMC) material that includes a conductive additive (e.g., graphite). The conductive additive is dispersed substantially homogeneously throughout the BMC material such that the first throttle cone 14 is conductive to provide resistance-heating capabilities as will be discussed in greater detail below. The illustrated BMC material is available from Bulk Molding Compounds, Inc. located in West Chicago, Ill. as Product No. BMC 945-17510 and will be discussed in detail below with regard to the method of forming the throttle valve 10. Other materials with similar properties may also be used, as desired.

The second throttle cone 18 is sized and configured to fit into the substantially hollow center of the first throttle cone 14 and selectively mate and nest therewith. The second throttle cone 18 includes a circular disk portion 94 substantially parallel to the plane B and sized to mate with the flat surface 38 of the rim 34. The circular disk portion 94 includes a sealing edge 98 that substantially matches the rim sealing surface 42 to selectively form a seal therebetween. Two depressions 102 (FIG. 2a) are formed in the circular disk portion 94 and are sized to receive the two tabs 46 of the rim 34 as discussed further below. In another embodiment, the tabs 46 are formed on the second throttle cone 18 and the depressions 102 are formed on the first throttle cone 14 to be selectively received within the first throttle cone 14. Additionally, any number of tabs 46 and depressions 102 may be utilized.

An actuating rod 106 is molded to the circular disk portion 94 and extends along the axis C. The actuating rod 106 is received through the aperture 90, and supported on the bearing surface, in the first throttle cone 14 to allow controlled axial and rotational movement of the second throttle cone 18 with respect to the first throttle cone 14. The illustrated actuating rod 106 includes a first portion 110 with a first diameter, a second portion 114 with a second smaller diameter, an aperture 118 formed in the first portion 110 perpendicular to the axis C, and a notch 122 formed in the distal end of the second portion 114. The illustrated notch 122 is used for alignment during the molding process, as described below. Alternatively, the aperture 118 may also be used to align the actuating rod 106 during the molding process. In one embodiment, an end of the actuating rod 106 opposite the notch 122 includes a knurled or notched end (not shown) to facilitate bonding when molded into the second throttle cone 18. Alternatively, the actuating rod 106 may be integrally formed from the thermoset plastic material during the forming of the second throttle cone 18 or may be eliminated. An optional sealing arrangement may be positioned within the cylindrical portion 82 to form a seal between the actuating rod 106 and the first throttle cone 14.

The second throttle cone 18 also includes a first cover portion 126 and a second cover portion 130. The first and second cover portions 126, 130 extend away from the circular disk portion 94 in a direction opposite the actuating rod 106. The first and second cover portions 126, 130 are shaped to correspond with the first and second windows 50, 54, respectively, and each includes a sealing surface 134 along three edges. The sealing surfaces 134 of the first and second cover portions 126, 130 selectively seal against the respective sealing seats 58 of the first and second windows 50, 54. The illustrated sealing surfaces 134 are beveled to match the sealing seats 58. Additionally, the first and second cover portions 126, 130 each extend to a distal end 138 of the second throttle cone 18.

The first cover portion 126 and the second cover portion 130 are separated by two voids 140 such that the distal end 138 does not form a continuous circle or perimeter. The voids 140 allow fluid flow through the throttle valve 10 as will be described below.

A spine 142 is formed between and interconnects the first cover portion 126, the second cover portion 130, and the circular disk portion 94 to provide rigidity to the second throttle cone 18. The illustrated spine 142 extends from the circular disk portion 94 almost to the distal end 138 and bisects each of the first and second cover portions 126, 130. The spine 142 may vary in shape and depth toward the distal end 138 to provide a desirable rigidity and to provide desirable flow characteristics (e.g., flow separation) with respect to the first and second flow windows 46, 50.

In operation, the throttle valve 10 is positioned in the air intake of a vehicle engine (not shown). The first throttle cone 14 is mounted to the engine and the electrodes 78 are connected to an electrical system via suitable connectors (not shown). The actuating rod 106 is engaged by an actuating system (not shown) via the aperture 118.

The second throttle cone 18 is moveable between a first position wherein the first and second cover portions 126, 130 inhibit air flow through the throttle valve 10 by sealing the sealing surfaces 134 against the sealing seats 58 of the first and second windows 50, 54, respectively, and a second position where the first and second cover portions 126, 130 allow air to flow through the throttle valve 10. The second throttle cone 18 is moved axially and rotationally relative to the first throttle cone 14 to open the first and second windows 50, 54.

In the illustrated embodiment, tabs 46 and depressions 102 include camming surfaces rounded portions 146 that are designed such that the radii of the rounded portions 146 provide a desirable movement profile. The cutout area 86 also has camming surfaces or rounded portions 150 that provide a desirable movement profile. A pin (not shown) that is inserted through the aperture 118 is sized to cooperate with the rounded portions 150 of the cutout area 86. As the second throttle cone 18 moves between the first position and the second position, the interplay between the rounded portions 146 of the tabs 46 and the depressions 102, and the interplay between the rounded portions 150 of the cutout 86 and the pin inserted in the aperture 118, provide a desired movement path axially and/or rotationally for the second throttle cone 18 relative to the first throttle cone 14. During a portion of the movement between the first position and the second position, the second throttle cone 18 is moving both axially and rotationally relative to the first throttle cone 14 as guided by the rounded portions 146, 150. The operation described above is achieved through the use of a specially designed gear drive (not shown) engaging the first and second portions 110, 114 and the pin installed into aperture 118.

When the second throttle cone 18 is in the first position, the distal end 138 intersects the plane B and is adjacent the first distal end 22 of the first throttle cone 14. When in the second position, the second throttle cone 18 is moved axially in the direction of the axis C such that the tabs 46 are no longer disposed within the depressions 102 and the second throttle cone 18 is rotated about the axis C about ninety degrees such that air may flow through the windows 50, 54. The actuator system moves the second throttle cone 18 between the first and second position to selectively control the flow of air to a combustion chamber (not shown) of the engine. At positions between the first position and the second position (i.e., an infinite number of possible positions between the first and second positions), the throttle valve 10 allows a variable amount of air or fluid to flow therethrough and may be used to control the combustion characteristics of the engine. When the second throttle cone 18 is not in the first position, the first throttle cone 14 and the second throttle cone 18 are at least partially separated such that a desired portion of air or fluid may flow through the windows 50, 54.

In a cold environment (e.g., winter in a northern climate), the throttle valve 10 may have a tendency to become cold and freeze, thereby causing the first and second throttle components 14, 18 to stick and resist relative movement between the first and second positions. In such cases, the heating features are utilized and electricity may be provided to the electrodes 78. When a current is applied to the electrodes 78, energy flows through the conductive additive throughout the first throttle cone 14 and resistively heats the throttle valve 10. The addition of the conductive additive provides a valve heating solution without the addition of complicated heaters, metallic coils, or other costly and less reliable systems typically employed such as engine coolant passages. The heating features may be activated any time before, during, and/or after operation of the throttle valve 10 to release ice build up and/or to prevent ice from accumulating through the thermodynamic refrigeration phenomena known as expansion. Additionally, a mechanical ice breaking operation may be used wherein the second throttle cone 18 moves axially between the first and second positions to dislodge and break ice away from the throttle valve 10 with the use of the specially designed gear drive and by taking advantage of mechanical leverage.

Figure 3:
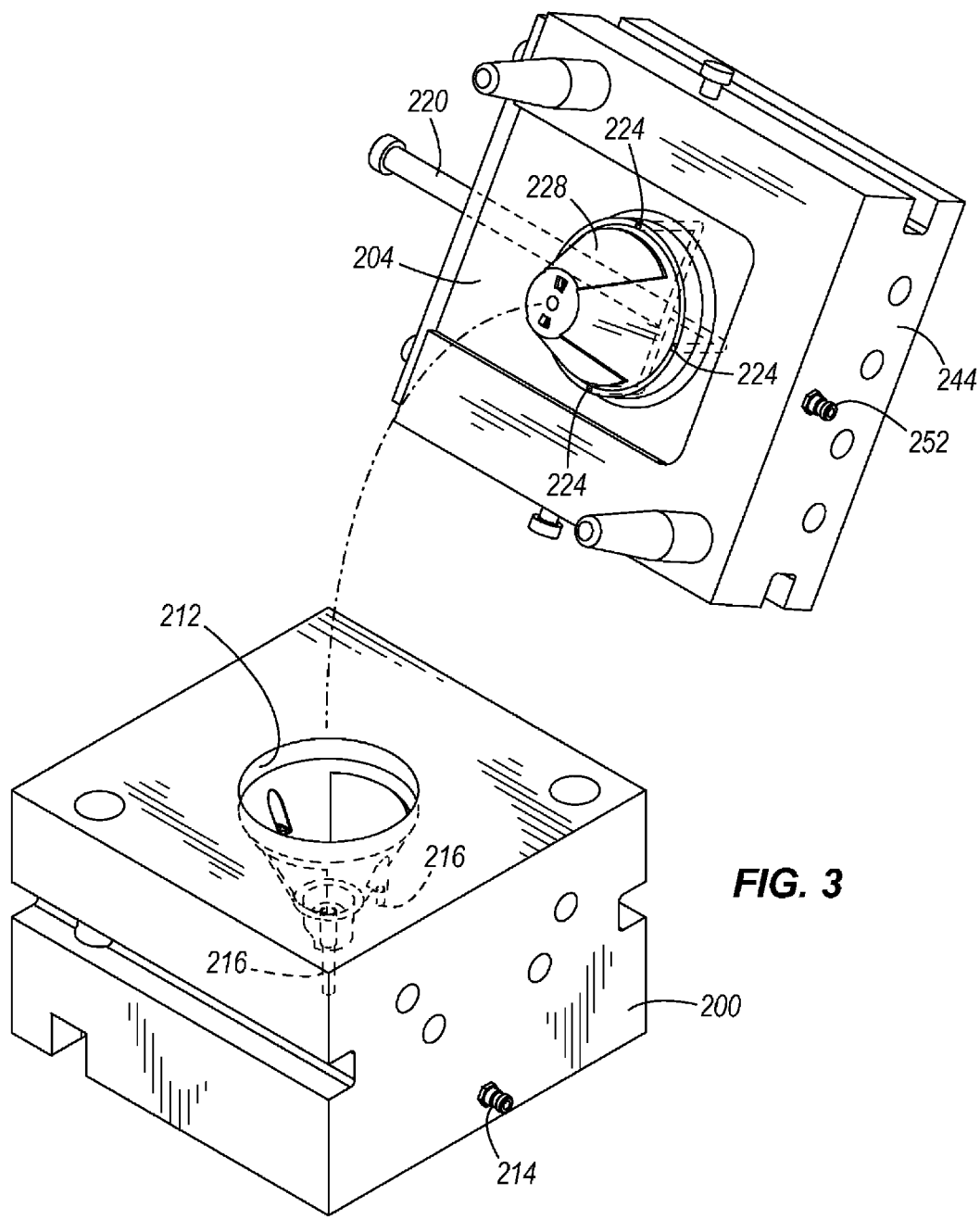
FIG. 3 is a perspective view of a mold portion and a first mold core according to one embodiment of the invention.
Figure 4:
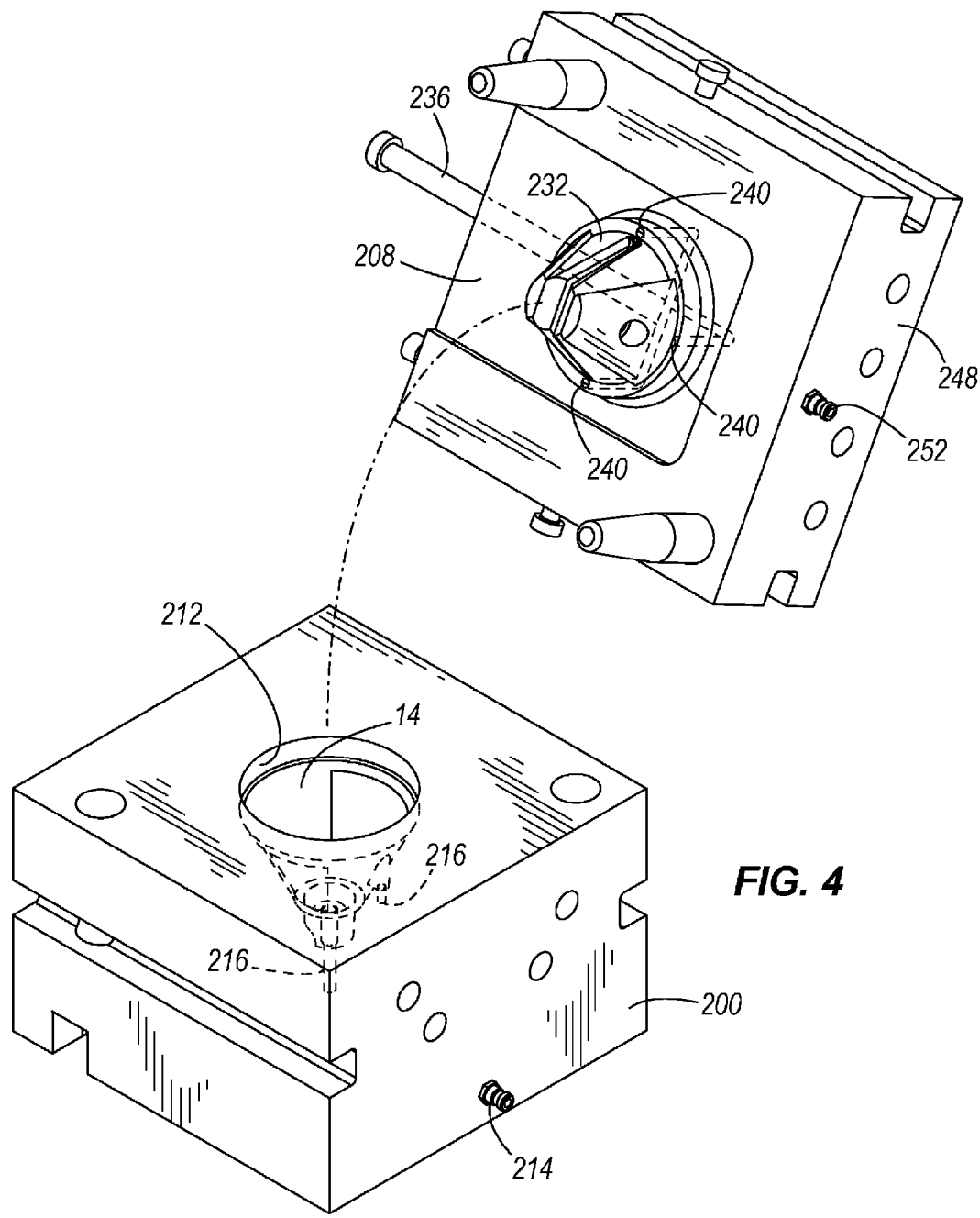
FIG. 4 is a perspective view of the mold portion of FIG. 3 and a second mold core according to one embodiment of the invention.

Described hereafter with respect to FIGS. 3 and 4 is an apparatus and method for producing a throttle valve 10 as described above. The apparatus includes a mold portion 200, a first core 204, and a second core 208.

The mold portion 200 includes a generally frustoconical depression 212 that includes mold features for forming the first distal end 22, the wall portion 30, the rim 34, the cylindrical portion 82, and the protrusions 62, 66 of the first throttle cone 14. Some geometry of the first and second windows 50, 54 and first and second cover portions 126, 130 are also formed by the mold portion 200 as will become apparent below. Any other features on the external surface of the throttle valve 10 are also formed in the mold portion 200, as desired. A pneumatic ejection port 214 is formed in the mold portion 200 for ejecting the throttle valve from the frustoconical depression 212.

In the illustrated embodiment, the mold portion 200 also includes holding geometry in the form of recesses 216 to hold the electrodes 78 and the actuating rod 106 in place such that they may be molded into the first and second throttle cones 14, 18, respectively.

The first core 204 (FIG. 3) includes a generally frustoconically shaped protrusion 228 that includes mold features for forming the first and second windows 50, 54, the tabs 46, the first distal end 22, the rim 34, and other features of the first throttle cone 14.

A first resin flow path 220 is formed in the first core 204 (e.g., defined by a conduit and a bore) and provides a flow path for molten resin (e.g., BMC material) through the first core 204. The illustrated first resin flow path 220 includes four outlets 224 (three are visible in FIG. 3) positioned to inject molten resin into the generally frustoconical depression 212, although more or fewer outlets are contemplated and any number of outlets may be utilized, as desired.

The second core 208 (FIG. 4) includes a generally frustoconically shaped protrusion 232 that includes mold features for forming the first and second cover portions 126, 130, the spine 142, the circular disk portion 94, and other features of the second throttle cone 18. The illustrated first and second cores 204, 208 includes features for forming the first and second flow windows 50, 54 and the first and second cover portions 126, 130 such that the size and configuration may be changed. For example, the first and second cores 204, 208 may be changed to produce larger or smaller flow windows 46, 50 and covers 126, 130 or flow windows 46, 50 and covers 126, 130 with a different geometry, as desired.

A second resin flow path 236 (FIG. 4) is formed in the second core 208 (e.g., defined by a conduit and a bore) and provides a flow path for molten resin (e.g., BMC material) through the second core 208. The illustrated second resin flow path 236 includes four outlets 240 (three are visible in FIG. 4) positioned to inject molten resin into the generally frustoconical depression 212, although more or fewer outlets are contemplated and any number of outlets may be utilized, as desired.

In the illustrated embodiment, the first core 204 is held by a first core holding tool 244 and the second core 208 is held by a second core holding tool 248. The first and second core holding tools 244, 248 include pneumatic ejection ports 252 similar to the ejection port 214 for ejecting the throttle valve 10 from the first and second cores 204, 208. In another embodiment, the first core holding tool 244 and the second core holding tool 248 are the same component and the first core 204 and the second core 208 are both held by a single holding tool. In yet another embodiment, a single holding tool is utilized but only holds either the first core 204 or the second core 208 at any one time, such that the first core 204 and the second core 208 must be interchanged during a forming operation. Other core holding arrangements may be realized to optimize the speed, efficiency, or other factors, as desired.

In operation, the two electrodes 78 and the actuating rod 106 are positioned in the holding geometry 216 of the mold portion 200, and the first core 204 is moved into the mold portion 200 and held in place to form a first mold cavity between the mold portion 200 and the first core 204. Then, a first shot of molten resin (e.g., including the conductive additive) is pushed into the first mold cavity via the first resin flow path 220 to form the first throttle cone 14 including the first and second windows 50, 54, the sealing seats 58, the tabs 46, the apertures 90, and all the other features of the first throttle cone 14. In the illustrated embodiment, the actuating rod 106 is used as a part of the first mold cavity to form the aperture 90 and the bearing surface. This allows for a substantially perfect mating and bearing surface between the bearing surface of the aperture 90 and the actuating rod 106. The first shot of molten resin fills the first mold cavity such that substantially no pockets exist. After the first shot of molten resin sets and cures satisfactorily, the first core 204 is removed. In the illustrated embodiment, the molten resin is raised to an elevated temperature and pressure while in the first mold cavity to set the thermoplastic resin. The elevated temperature and pressure are maintained for a predetermined amount of time to allow the thermoplastic to cure. The temperature and pressure may be varied to produce desirable results. For example, a controlled cooling cycle may be used to cure the first throttle cone 14.

After the first core 204 is removed, with the first throttle cone 14 and the actuating rod 106 still positioned in the mold portion 200, the second core 208 is positioned within the mold portion 200 such that a second mold cavity is formed between the mold portion 200, the first throttle cone 14, and the second core 208. Then, a second shot of molten resin is pushed into the second mold cavity via the second resin flow path 236 to form the second throttle cone 18 including the cover portions 126, 130, the sealing surface 134, the depressions 102, and the other features of the second throttle cone 18. The second shot of molten resin fills the second mold cavity such that substantially no pockets exist and the second throttle cone 18 is formed substantially completely to the first throttle cone 14. The mating surfaces of the second throttle cone 18 are formed directly to the first throttle cone 14. For example, the sealing seats 58 of the first throttle cone 14 act as the portions of the second mold cavity that form the respective sealing surfaces 134 of the second throttle cone 18 such that the mating relationship between the sealing seats 58 and the sealing surfaces 134 is substantially perfect. After the second shot of molten resin sets and cures satisfactorily, the second core 208 is removed from the mold portion 200. In the illustrated embodiment, the molten resin is raised to an elevated temperature and pressure while in the second mold cavity to set the thermoset plastic resin. The elevated temperature and pressure are maintained for a predetermined amount of time to allow the thermoset plastic to cure. The temperature and pressure may be varied to produce desirable results. For example, a controlled cooling cycle may be used to cure the second throttle cone 18. In addition, the setting and curing parameters may be different for the first throttle cone 14 and the second throttle cone 18, as desired.

The throttle valve 10 may then be removed from the mold portion 200 as a unit. The first throttle cone 14 and the second throttle cone 18 are a mated pair with matching features due to being formed together (i.e., the second throttle cone 18 molded directly to the first throttle cone 14). Additionally, the first and second throttle cones 14, 18 may be removed from the mold portion 200 separately while maintaining an association between the first throttle cone 14 and the second throttle cone 18 (e.g., color coding, labeling, organized stacking/boxing, or nesting of parts, etc.). In one embodiment, the first throttle cone 14 and the second throttle cone 18 are at least partially separated from one another either during or after removal from the mold portion 200. The actuating rod 106 remains disposed within the aperture 90 while the first throttle cone 14 and the second throttle cone 18 are at least partially separated (i.e., mating features of the first and second throttle cones 14, 18 are spaced apart from one another). Additionally, the first throttle cone 14 and the second throttle cone 18 may be completely separated (i.e., with the actuating rod 106 completely removed from the aperture 90). Partial or complete separation may be used for cleaning, polishing, flashing removal, or other finishing and processing operations, as desired.

In an alternate embodiment, a compression molding process is utilized wherein pre-measured composite billets or slugs are placed into the mold portion 200 and compressed by the first and second cores 204, 208 to form the throttle components in generally the same sequence and manner as described above. For example, a first plastic billet is positioned within mold portion 200 before the first core 204 is brought into the mold portion 200. The first core 204 then compresses the billet within the mold portion 200 such that the billet fills the first throttle component cavity and forms the first throttle cone 14.

After the first throttle cone 14 cures (similar to the injection molding process described above), the first core 204 is removed from the mold portion 200 and a second plastic billet is provided into the mold portion 200 with the first throttle cone 14 still in place. The second core 18 is then brought into the mold portion 200 to compress the second billet and fill the second throttle component cavity to form the second throttle cone 18. The second throttle cone 18 then cures within the second throttle component cavity and the second core 208 is removed. In other embodiments, a combination of injection and compression molding process may be utilized, as desired.

The first and second billets are made of materials comparable to those used in the injection molding process described above and produce similar parts. In other embodiments, different materials may be used, as desired. Additionally, the billets may be warmed or softened before being provided to the mold portion 200.

In the above examples, the material used for the first throttle cone 14 is a BMC material that is a thermoset plastic. Further, the conductive additive provides a resistive heating ability to the plastic. Various additives create a plastic that can be used in the above method such that the throttle valve 10 has sufficient rigidity and moldability, and such that the first and second cones 14, 18 may be separated from one another after the two shot molding process. The BMC material used by the Assignee to form the first throttle cone 14 is produced by and available from Bulk Molding Compounds, Inc. located in West Chicago, Ill. as Product No. BMC 945-17510. Other materials with similar properties may be used.

The illustrated second throttle cone 18 is formed of a second BMC material without the conductive additive. The second BMC material is designed to separate cleanly from the first throttle cone 14 after the two shot molding process and is produced by and available from Bulk Molding Compounds, Inc. located in West Chicago, Ill. as Product No. BMC 304-17202. In other embodiments, other materials may be used, or the second throttle cone 18 may be formed of a conductive material similar to or the same as the first throttle cone 14. Additionally, the first throttle cone 14 may be unheated and the second throttle cone 18 can include heating features. Furthermore, both the first and the second throttle cones 14, 18 may be formed of a BMC material without a conductive filler such that the throttle valve 10 is not heated.

In other embodiments, the throttle assembly may vary such that the first throttle component is an inner cone, and the second throttle component is an outer cone. Furthermore, the throttle valve may be shaped differently and may include more components (e.g., cams, gears, shafts, etc.) that may be formed with or without the described method, as desired.

Various features and advantages of the invention are set forth in the following claims.

What is claimed is:

1. A method of producing a throttle assembly, the method comprising:
   inserting a first core into a mold portion to form a first throttle component cavity between the first core and the mold portion;
   providing a first thermoset plastic material into the first throttle component cavity to form a first throttle component;
   removing the first core from the mold portion while maintaining the first throttle component positioned within the mold portion;
   inserting a second core into the mold portion to form a second throttle component cavity between the mold portion, the first throttle component, and the second core;
   providing a second thermoset plastic material into the second throttle component cavity to form a second throttle component;
   removing the second core from the mold portion;
   removing the first throttle component and the second throttle component from the mold portion; and
   at least partially separating the first throttle component from the second throttle component.

2. The method of claim 1, further comprising maintaining an association between the first throttle component and the second throttle component to facilitate subsequent assembly of the first throttle component and the second throttle component into the throttle assembly.

3. The method of claim 1, further comprising inserting an actuating rod into the mold portion before providing the second thermoset plastic material into the second throttle component cavity such that the second throttle component is molded to the actuating rod.

4. The method of claim 1, further comprising inserting an actuating rod into the mold portion before providing the first thermoset plastic material into the first throttle component cavity such that the actuating rod forms at least a portion of the first throttle component cavity, and the first throttle component is formed with a bearing surface at an interface between the actuating rod and the first throttle component.

5. The method of claim 1, wherein providing the first thermoset plastic material into the first throttle component cavity includes providing a thermoset plastic material that includes a conductive additive.

6. The method of claim 5, wherein the conductive additive is substantially homogeneously dispersed throughout the thermoset plastic material.

7. The method of claim 5, further comprising inserting a terminal into the first throttle component cavity before providing the first thermoset plastic material into the first throttle component cavity such that the first throttle component is molded to the terminal.

8. The method of claim 1, further comprising curing the first throttle component before removing the first core from the mold portion, and curing the second throttle component before removing the second core from the mold portion.

9. The method of claim 1, wherein providing the first thermoset plastic material into the first throttle component cavity includes providing a bulk molding compound into the first throttle component cavity.

10. The method of claim 1, wherein removing the first throttle component and the second throttle component from the mold portion includes removing the first throttle component and the second throttle component from the mold portion together as a unit.

11. The method of claim 1, wherein providing the first thermoset plastic material into the first throttle component cavity to form the first throttle component includes forming a window in the first throttle component.

12. The method of claim 11, wherein providing the first thermoset plastic material into the first throttle component cavity to form the first throttle component includes forming a sealing seat around a at least a portion of a perimeter of the window.

13. The method of claim 12, wherein providing the second thermoset plastic material into the second throttle component cavity to form the second throttle component includes forming a cover portion in the second throttle component that substantially matches the window.

14. The method of claim 13, wherein providing the second thermoset plastic material into the second throttle component cavity to form the second throttle component includes forming a sealing surface around at least a portion of a perimeter of the cover portion such that the sealing surface substantially seals against the sealing seat of the first throttle component.

15. The method of claim 14, wherein the sealing seat acts as the portion of the second throttle component cavity that forms the sealing surface.

16. The method of claim 1, wherein providing the first thermoset plastic material into the first throttle component cavity to form the first throttle component includes forming a tab on the first throttle component; and wherein providing the second thermoset plastic material into the second throttle component cavity to form the second throttle component includes forming a depression in the second throttle component sized to receive the tab of the first throttle component to index the second throttle component relative to the first throttle component, and wherein the tab acts as a portion of the second throttle component cavity that forms the depression.

17. The method of claim 1, wherein providing the first thermoset plastic material into the first throttle component cavity includes injecting the first thermoset plastic material into the first throttle component cavity after inserting the first core into the mold portion to form the first throttle component via an injection molding process.

18. The method of claim 1, wherein providing the first thermoset plastic material into the first throttle component cavity includes providing a resin billet into the first throttle component cavity before inserting the first core into the mold portion to form the first throttle component via a compression molding process.

19. The method of claim 1, wherein removing the first throttle component and the second throttle component from the mold portion includes ejecting the first throttle component and the second throttle component from the mold portion after the first throttle component and the second throttle component have cured.

20. The method of claim 1, wherein providing a second thermoset plastic material includes providing a thermoset plastic material that is different from the first thermoset plastic material.

21. A method of producing a throttle assembly, the method comprising:

inserting a first core into a mold portion to form a first throttle component cavity between the first core and the mold portion;

providing a first thermoset plastic material into the first throttle component cavity to form a first throttle component including a window and a sealing seat around at least a portion of a perimeter of the window;

removing the first core from the mold portion while maintaining the first throttle component positioned within the mold portion;

inserting a second core into the mold portion to form a second throttle component cavity between the mold portion, the first throttle component, and the second core;

providing a second thermoset plastic material into the second throttle component cavity to form a second throttle component including a cover portion that substantially matches the window and a sealing surface around at least a portion of a perimeter of the cover portion, wherein the sealing seat acts as the portion of the second throttle component cavity that forms the sealing surface;

removing the second core from the mold portion;

removing the first throttle component and the second throttle component from the mold portion;

at least partially separating the first throttle component from the second throttle component; and maintaining an association between the first throttle component and the second throttle component to facilitate subsequent assembly of the first throttle component and the second throttle component into the throttle assembly.

* * * * *